United States Patent
Tachibana et al.

(10) Patent No.: US 9,656,723 B1
(45) Date of Patent: May 23, 2017

(54) ELECTRICAL BICYCLE DERAILLEUR

(71) Applicant: Shimano Inc., Sakai, Osaka (JP)

(72) Inventors: Hiroshi Tachibana, Osaka (JP); Takeshi Ueda, Osaka (JP); Yuta Mizutani, Osaka (JP); Keijiro Nishi, Osaka (JP); Takahiro Tabata, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/968,873

(22) Filed: Dec. 14, 2015

(51) Int. Cl.
| | |
|---|---|
| *F16H 9/00* | (2006.01) |
| *F16H 59/00* | (2006.01) |
| *F16H 61/00* | (2006.01) |
| *F16H 63/00* | (2006.01) |
| *B62M 9/122* | (2010.01) |

(52) U.S. Cl.
CPC .................... *B62M 9/122* (2013.01)

(58) Field of Classification Search
CPC .... B62M 9/122; B62M 25/08; B62M 9/1242; B62M 9/128; B62M 9/1244
USPC ..................................... 474/80, 82
See application file for complete search history.

(56) References Cited

U.S. PATENT DOCUMENTS

| | | | | |
|---|---|---|---|---|
| 3,863,512 A | * | 2/1975 | Crawley | B62M 9/122 474/110 |
| 3,919,891 A | * | 11/1975 | Stuhlmuller | B62M 25/08 192/142 R |
| 4,041,788 A | * | 8/1977 | Nininger, Jr. | B62M 25/08 474/110 |
| 4,469,479 A | * | 9/1984 | Ozaki | B62M 9/1244 474/80 |
| 4,857,036 A | * | 8/1989 | Romano | B62M 9/1242 474/80 |
| 4,946,425 A | * | 8/1990 | Buhlmann | B62M 9/122 192/142 R |
| 5,480,356 A | * | 1/1996 | Campagnolo | B62M 9/122 280/238 |
| 5,494,307 A | * | 2/1996 | Anderson | B62M 9/122 280/236 |
| 5,890,979 A | * | 4/1999 | Wendler | B62L 3/023 474/110 |

(Continued)

FOREIGN PATENT DOCUMENTS

| | | |
|---|---|---|
| CN | 104843137 A | 8/2015 |
| IT | PD 2012 A 000325 | 11/2012 |
| IT | PD 2012 A 000326 | 11/2012 |

*Primary Examiner* — Henry Liu
(74) *Attorney, Agent, or Firm* — Global IP Counselors, LLP

(57) ABSTRACT

An electrical bicycle derailleur includes a base member and a movable member movably arranged between a retracted position and an extended position. A linkage operatively couples the movable member to the base member. The linkage includes a first link member and a second link member. The first link member is disposed closer to the base member than the second link member. A motor unit is operatively coupled to the first and second link members to rotate the first and second link members. A linkage housing is configured to support the first and second link members and the motor unit. A first diameter of the first link member is different from a second diameter of the second link member and/or a first tooth number of the first link member is different from a second tooth number of the second link member.

18 Claims, 9 Drawing Sheets

(56) References Cited

U.S. PATENT DOCUMENTS

| | | | | |
|---|---|---|---|---|
| 6,162,140 | A * | 12/2000 | Fukuda | B62M 9/122 474/70 |
| 6,623,389 | B1 * | 9/2003 | Campagnolo | B62M 9/122 474/70 |
| 6,676,549 | B1 * | 1/2004 | Fukuda | B62M 9/122 474/102 |
| 6,740,003 | B2 * | 5/2004 | Fukuda | B62M 9/122 474/80 |
| 6,761,655 | B2 * | 7/2004 | Fukuda | B62M 9/122 474/102 |
| 6,945,888 | B2 * | 9/2005 | Fukuda | B62J 99/00 474/70 |
| 6,997,835 | B2 * | 2/2006 | Fukuda | B62M 9/122 474/80 |
| 7,004,862 | B2 * | 2/2006 | Fukuda | B62M 9/122 474/102 |
| 7,320,655 | B2 * | 1/2008 | Fukuda | B62M 9/1244 474/70 |
| 7,549,662 | B2 * | 6/2009 | Righi | B62M 9/122 280/257 |
| 7,563,186 | B2 * | 7/2009 | Mercat | B62M 25/08 474/70 |
| 7,585,237 | B2 * | 9/2009 | Fukuda | B62M 9/125 403/2 |
| 8,025,597 | B2 * | 9/2011 | Takamoto | B62M 9/122 474/70 |
| 8,137,223 | B2 * | 3/2012 | Watarai | B62K 23/06 280/260 |
| 9,005,059 | B2 * | 4/2015 | Suyama | B62M 9/122 474/80 |
| 2002/0025868 | A1 * | 2/2002 | Fukuda | B62M 9/122 474/70 |
| 2002/0061797 | A1 * | 5/2002 | Valle | B62M 9/132 474/70 |
| 2002/0082128 | A1 * | 6/2002 | Fukuda | B62M 9/122 474/70 |
| 2004/0116221 | A1 * | 6/2004 | Fukuda | B62M 9/1244 474/82 |
| 2004/0138017 | A1 * | 7/2004 | Kitamura | B62M 9/122 474/82 |
| 2005/0187050 | A1 * | 8/2005 | Fukuda | B62M 9/122 474/80 |
| 2005/0215369 | A1 * | 9/2005 | Fukuda | B62M 25/08 474/82 |
| 2006/0100045 | A1 * | 5/2006 | Fukuda | B62M 9/122 474/70 |
| 2009/0098963 | A1 * | 4/2009 | Watarai | B62K 23/06 474/80 |
| 2009/0209375 | A1 * | 8/2009 | Takamoto | B62M 9/122 474/18 |
| 2009/0215561 | A1 * | 8/2009 | Fukuda | B62M 25/08 474/82 |
| 2012/0322591 | A1 * | 12/2012 | Kitamura | B62J 6/06 474/80 |
| 2014/0087901 | A1 * | 3/2014 | Shipman | B62M 9/132 474/82 |
| 2014/0213397 | A1 * | 7/2014 | Yamaguchi | B62M 9/122 474/80 |
| 2014/0243127 | A1 * | 8/2014 | Pasqua | B62M 9/132 474/80 |
| 2015/0111675 | A1 * | 4/2015 | Shipman | B62M 9/122 474/82 |
| 2015/0148159 | A1 * | 5/2015 | Rosati | B62M 9/125 474/80 |
| 2015/0259031 | A1 * | 9/2015 | Sala | B62M 9/124 474/80 |

* cited by examiner

ELECTRICAL BICYCLE DERAILLEUR

BACKGROUND OF THE INVENTION

Field of the Invention

The present invention generally relates to an electrical bicycle derailleur. More specifically, the present invention relates to an electrical bicycle derailleur that facilitates movement of a movable member of a chain drive transmission.

Background Information

A bicycle typically uses a chain drive transmission for transmitting a pedaling force to a rear wheel. The chain drive transmission of a bicycle often uses derailleurs to selectively move a chain from one of a plurality of sprockets to another for changing speeds of the bicycle. A typical derailleur includes a base member, a movable member supporting a chain guide and a linkage (e.g., a moving mechanism) coupled between the base member and the movable member so that the chain guide moves laterally relative to the base member.

Recently, derailleurs have been equipped with motor units to make shifting gears easier. The motor unit drives a first link axle positioned close to the base member. The rotational driving torque from the motor unit is transmitted to a second link axle positioned close to the movable member through a transmission member, such as a belt or gear.

SUMMARY OF THE INVENTION

In view of the state of the known technology and in accordance with a first aspect of the present invention, an electrical bicycle derailleur includes a base member and a movable member movably arranged between a retracted position and an extended position. A linkage operatively couples the movable member to the base member. The linkage includes a first link member and a second link member. The first link member is disposed closer to the base member than the second link member. A motor unit is operatively coupled to the first and second link members to rotate the first and second link members. A linkage housing is configured to support the first and second link members and the motor unit. A first diameter of the first link member is different from a second diameter of the second link member and/or a first tooth number of the first link member is different from a second tooth number of the second link member.

In accordance with a second aspect of the present invention, the electrical bicycle derailleur according to the first aspect is configured such that the first link member includes a first gear member connected to the base member, and the second link member includes a second gear member connected to the movable member.

In accordance with a third aspect of the present invention, the electrical bicycle derailleur according to the first aspect is configured such that the first diameter of the first link member is larger than the second diameter of the second link member.

In accordance with a fourth aspect of the present invention, the electrical bicycle derailleur according to the first aspect is configured such that the first diameter of the first link member is smaller than the second diameter of the second link member.

In accordance with a fifth aspect of the present invention, the electrical bicycle derailleur according to the first aspect is configured such that the first tooth number of the first link member is larger than the second tooth number of the second link member.

In accordance with a sixth aspect of the present invention, the electrical bicycle derailleur according to the first aspect is configured such that the first tooth number of the first link member is smaller than the second tooth number of the second link member.

In accordance with a seventh aspect of the present invention, the electrical bicycle derailleur according to the first aspect is configured such that the linkage housing includes an internal space in which the first and second link members and the motor unit are at least partly disposed.

In accordance with an eighth aspect of the present invention, the electrical bicycle derailleur according to the first aspect is configured such that the first link member directly engages the second link member.

In accordance with a ninth aspect of the present invention, the electrical bicycle derailleur according to the first aspect is configured such that at least one belt member operatively couples the first link member and the second link member such that rotation of the one of the first and second link members is transmitted to the other of the first and second link members via the at least one belt member. The motor unit is configured to rotate the second link member.

In accordance with a tenth aspect of the present invention, the electrical bicycle derailleur according to the first aspect is configured such that the linkage further includes a third link member disposed between the first and second link members, the third link member operatively engages the first and second link members, and the linkage housing is configured to support the third link member.

In accordance with an eleventh aspect of the present invention, the electrical bicycle derailleur according to the tenth aspect is configured such that the linkage housing includes an internal space in which the first, second, and third link members and the motor unit are at least partly disposed.

In accordance with a twelfth aspect of the present invention, the electrical bicycle derailleur according to the tenth aspect is configured such that the first link member includes a first gear member connected to the base member, the second link member includes a second gear member connected to the movable member, and the third link member includes a third gear member disposed between the first and second gear members.

In accordance with a thirteenth aspect of the present invention, the electrical bicycle derailleur according to the tenth aspect is configured such that the third link member directly engages the first and second link members.

In accordance with a fourteenth aspect of the present invention, the electrical bicycle derailleur according to the tenth aspect is configured such that at least one belt member operatively couples the third link member and at least one of the first and second link members such that rotation of the third link member rotates the at least one of the first and second link members via the at least one belt member.

In accordance with a fifteenth aspect of the present invention, the electrical bicycle derailleur according to the first aspect is configured such that a first rotational direction of the first link member and a second rotational direction of the second link member are opposite.

In accordance with a sixteenth aspect of the present invention, the electrical bicycle derailleur according to the first aspect is configured such that the motor unit includes an electrical motor and a speed reduction gear assembly. The electrical motor outputs drive power via the speed reduction gear assembly.

In accordance with a seventeenth aspect of the present invention, the electrical bicycle derailleur according to the second aspect is configured such that the first link member includes a first axle coaxially arranged with the first gear member, and the second link member includes a second axle coaxially arranged with the second gear member.

In accordance with an eighteenth aspect of the present invention, the electrical bicycle derailleur according to the twelfth aspect is configured such that the first link member includes a first axle coaxially arranged with the first gear member, the second link member includes a second axle coaxially arranged with the second gear member, and the third link member includes a third axle coaxially arranged with the third gear member.

In accordance with a nineteenth aspect of the present invention, the electrical bicycle derailleur according to the first aspect is configured such that a chain guide is movably coupled to the movable member.

In accordance with a twentieth aspect of the present invention, the electrical bicycle derailleur according to the nineteenth aspect is configured such that the chain guide includes a guide pulley and a tension pulley.

In accordance with a twenty-first aspect of the present invention, the electrical bicycle derailleur according to the first aspect is configured such that the base member is configured to be connected to a bicycle frame.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments of the present invention will now be explained with reference to the drawings. It will be apparent to those skilled in the art from this disclosure that the following descriptions of the exemplary embodiments of the present invention are provided for illustration only and not for the purpose of limiting the invention as defined by the appended claims and their equivalents.

Figure 1:
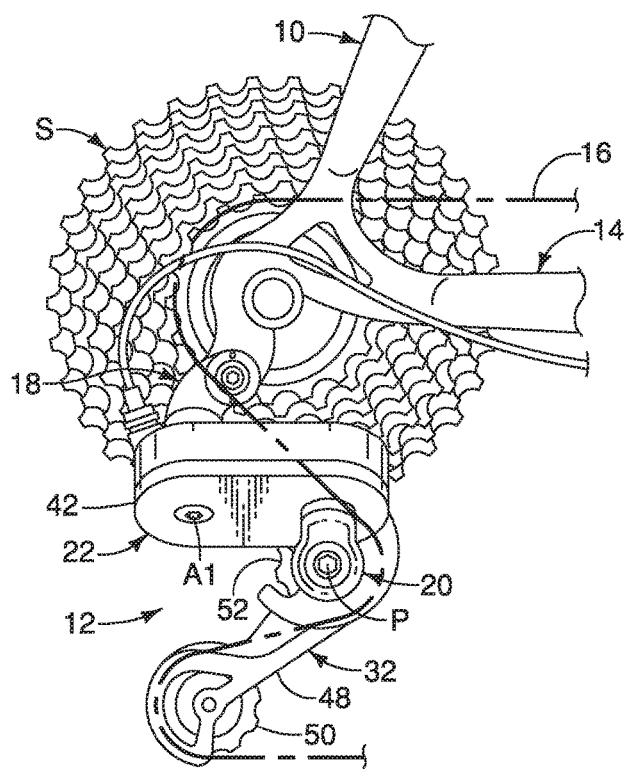
FIG. 1 is a partial side elevational view of a bicycle equipped with an electrical bicycle derailleur in which a movable member is in a first position in accordance with exemplary embodiments of the present invention.
Figure 2:
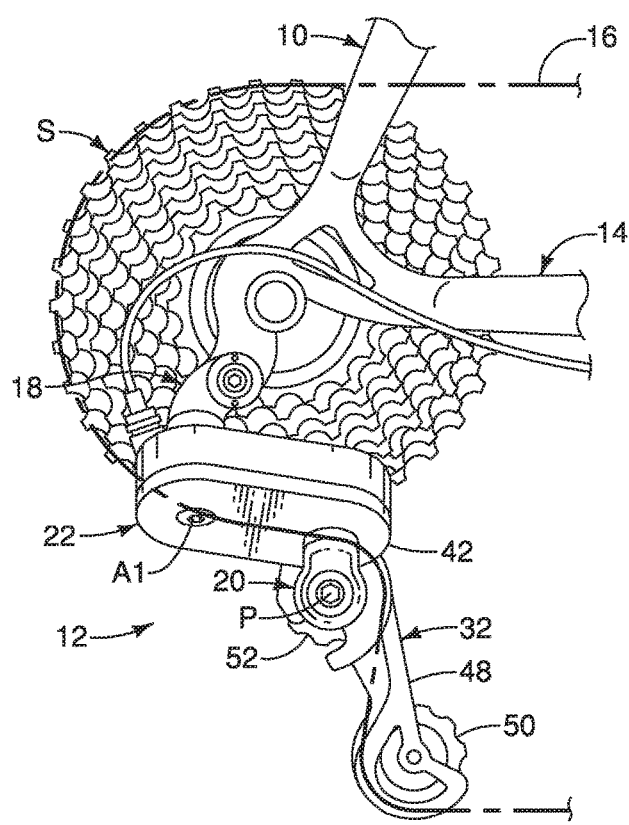
FIG. 2 is a partial side elevational view of the electrical bicycle derailleur of FIG. 1 in which the movable member is in a second position.

Referring initially to FIGS. 1 and 2, a rear portion of a bicycle 10 is illustrated that includes, among other things, an electrical bicycle derailleur in accordance with an illustrated exemplary embodiment. Although the following description is with regard to a rear derailleur 12, the exemplary embodiments of the present invention are equally applicable to a front derailleur.

The rear derailleur 12 is secured to a rear portion of a bicycle frame 14 in a conventional manner as discussed below. The rear derailleur 12 is operated by an electric rear shifter (not shown), which is a shift actuating device. The electric rear shifter operates the rear derailleur 12 between a plurality of shift stage (gear) positions such that a chain 16 is moved by the rear derailleur 12 between a plurality of rear sprockets S in a lateral direction with respect to a forward movement direction of the bicycle 10. The rear derailleur 12 is shown in a "top shift stage (gear) position" in FIG. 1, which refers to the rear derailleur 12 being in an operating position that corresponds to the chain 16 being guided onto the rear sprocket S with the smallest number of teeth. The rear derailleur 12 is illustrated in a "low shift stage (gear) position" in FIG. 2, which refers to the rear derailleur 12 being in an operating position that corresponds to the chain 16 being guided onto the rear sprocket S with the largest number of teeth.

The bicycle rear derailleur 12 basically includes a base member 18, a movable member 20 and a linkage 22. A motor unit 24 is operatively coupled to the linkage 22 to move the movable member 20 with respect to the base member 18. Thus, in the illustrated exemplary embodiment, the rear derailleur 12 constitutes an electrical or motorized rear bicycle derailleur.

In the illustrated exemplary embodiment, the base member 18 is configured to be connected to the bicycle frame 14, as shown in FIGS. 1 and 2. The base member 18 includes a fastener hole 26 configured to receive a fastener 28 and a nut 30 to mount the base member 18 to the bicycle 10. The movable member 20 is movably coupled to the base member 18 by the linkage 22. A chain guide 32 is movably coupled to the movable member 20 to be pivotable about a chain guide pivot axis P. The chain guide 32 is movable relative to the movable member 20 to maintain the chain 16 in proper tension. The movable member 20 is arranged between a retracted position (FIG. 1) and an extended position (FIG. 2) to facilitate moving the chain 16 between the sprockets S.

Figure 3:
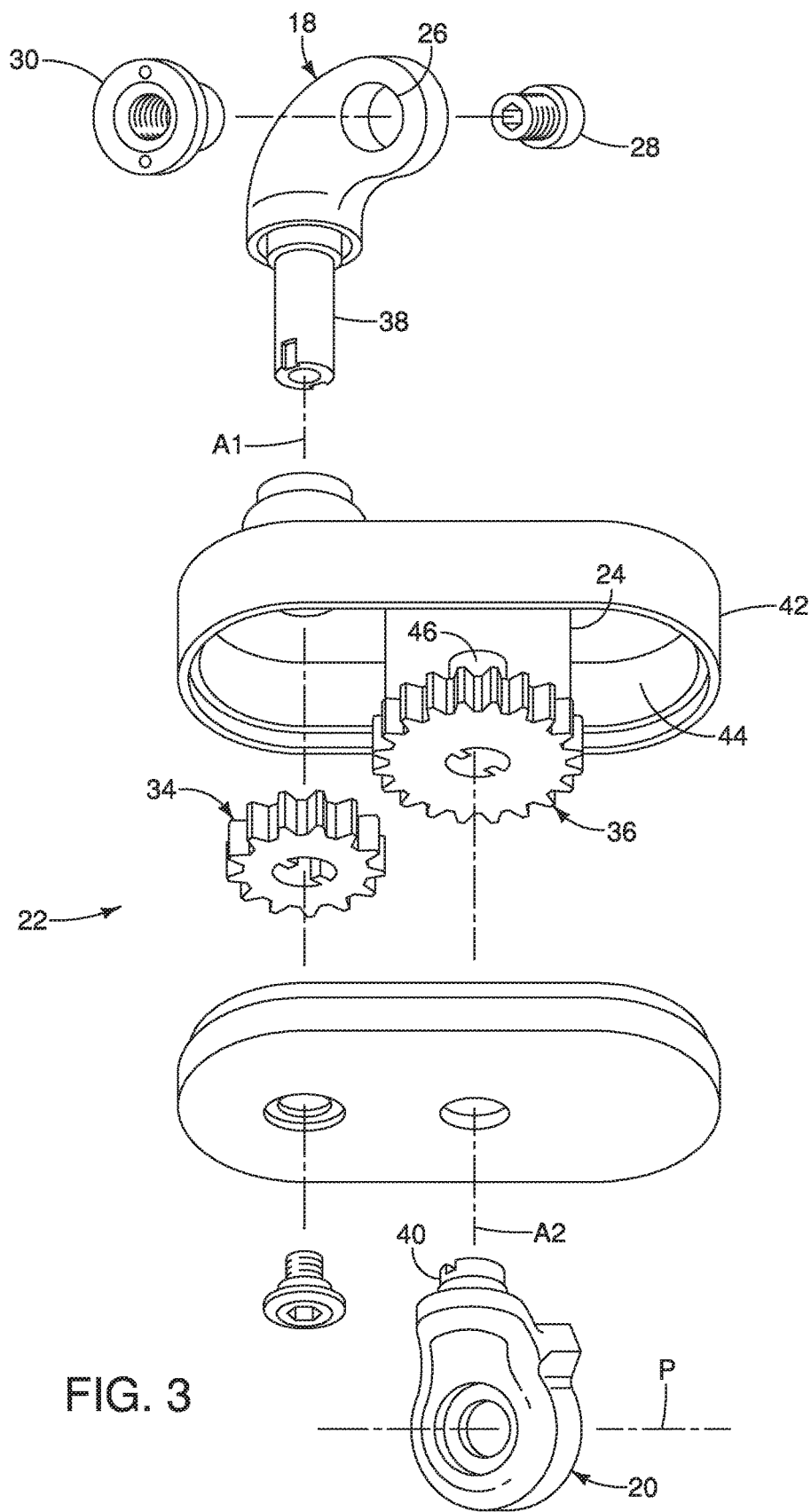
FIG. 3 is an exploded perspective view of an electrical bicycle derailleur in accordance with a first exemplary embodiment of the present invention.

In the exemplary embodiment illustrated in FIGS. 1-3, the linkage 22 operatively couples the movable member 20 and the base member 18. The linkage 22 includes a first link member 34 and a second link member 36. The first link member 34 is connected to the base member 18 by a pivot pin 38 about a first pivot axis A1. The second link member 36 is connected to the movable member 20 by a second pivot pin 40 about a second pivot axis A2. The first link member 34 is disposed closer to the base member 18 than the second link member 36, as shown in FIG. 3. Accordingly, a distance from an axis of rotation of the first link member 34 to the axis of rotation of the base member 18 is shorter than a distance from an axis of rotation of the second link member 36 to the axis of rotation of the base member 18.

A linkage housing 42 is configured to support the first link member 34, the second link member 36 and the motor unit 24. The linkage housing 42 defines an internal space 44 in which the first link member 34, the second link member 36 and the motor unit 24 are at least partly disposed.

A motor output shaft 46 of the motor unit 24 is received by the second link member 36, as shown in FIG. 3. An axis of rotation of the motor output shaft 46 is collinear with the second pivot axis A2. Although the second pivot pin 40 and the motor output shaft 46 are shown as separate members, a single unitary member can extend from the motor unit 24 through the second link member 36 to the movable member 20.

Figure 4:
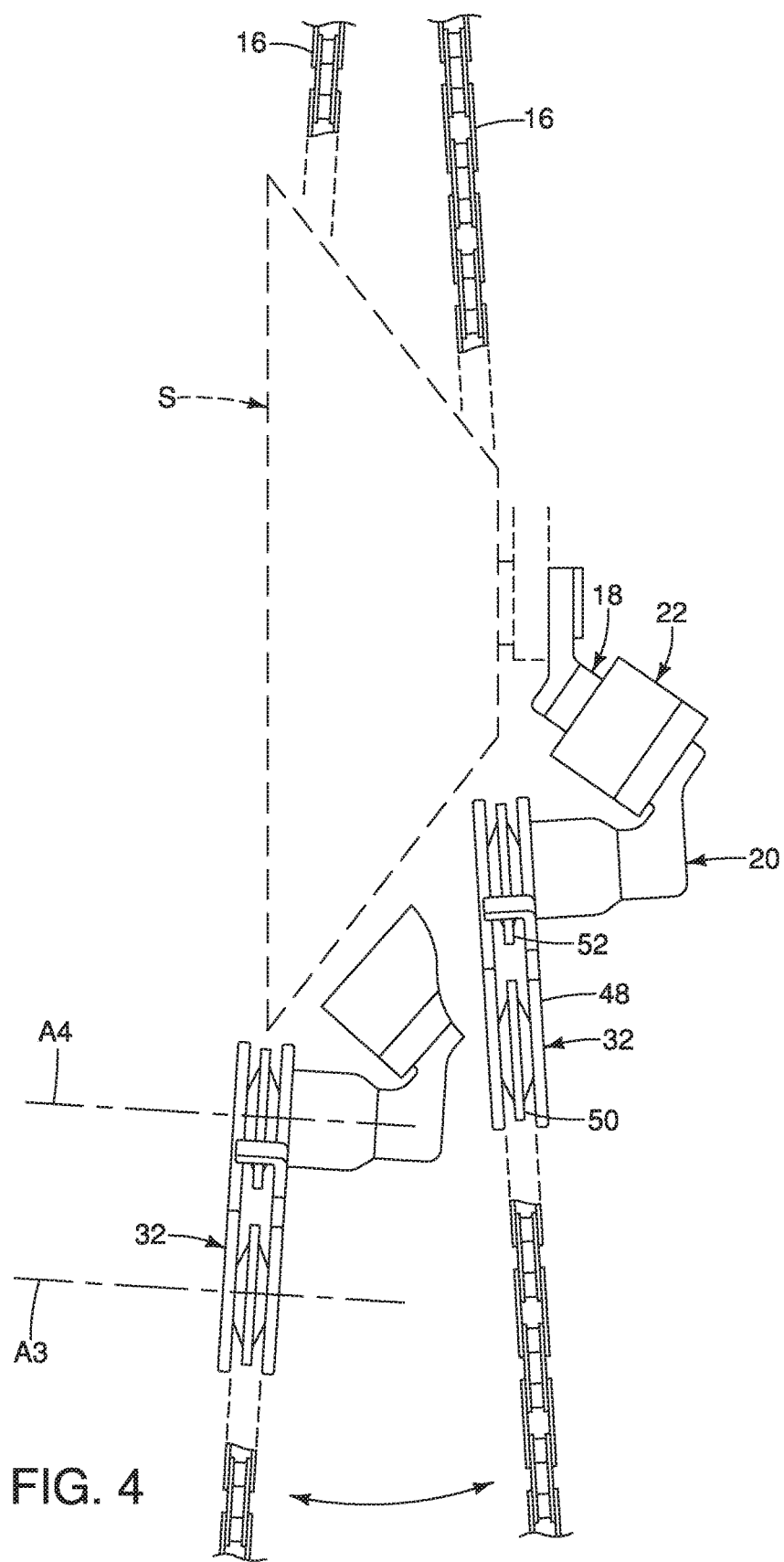
FIG. 4 is a rear elevational view of the electrical bicycle derailleur moved between first and second positions in which a chain remains substantially aligned with a chain guide.

The chain guide 32 includes a pair of chain cage plates 48, a tension pulley 50 and a guide pulley 52, as shown in FIGS. 1-4. The tension pulley 50 and the guide pulley 52 are rotatably disposed between the chain cage plates 48. The tension pulley 50 is rotatable about a pivot axis A3, as shown in FIG. 4. The guide pulley 52 is rotatable about a pivot axis A4, which is spaced from and substantially parallel to the pivot axis A3.

As shown in FIG. 3, the first link member 34 includes a first gear member and the second link member 36 includes a second gear member. A first axle, i.e., the pivot pin 38, is coaxially arranged with the first gear member of the first link member 34. The first gear member is connected to the base member 18. The second gear member is connected to the movable member 20. A second axle, i.e., the motor output shaft 46, is coaxially arranged with the second gear member of the second link member 36.

A first diameter of the first link member 34 is different from a second diameter of the second link member 36. Additionally, or instead of, a first tooth number of the first link member 34 is different from a second tooth number of the second link member 36. As shown in FIG. 3, the second link member 36 has a larger diameter than the diameter of the first link member 34, and/or the second link member 36 has more teeth than the first link member 34. Alternatively, the second link member 36 has a smaller diameter than the diameter of the first link member 34 (FIG. 15, for example), and/or the second link member 36 has fewer teeth than the first link member 34.

When the first tooth number and second tooth number are the same or the first and second diameters are the same, the rotational characteristics of the first and second link members are the same. Accordingly, when the derailleur shifts from a current position to another position, a running direction of the chain changes slightly such that the running direction of the chain is not aligned with the orientation of the chain guide. In accordance with the exemplary embodiments of the present invention, the first tooth number and second tooth number are different and/or the first and second diameters are different, i.e., the rotational characteristics of the first and second link members 34 and 36 are different. Accordingly, when the chain guide 32 moves in the lateral direction from a current position to another position, as shown in FIG. 4, the orientation of the chain guide 32 changes slightly. The configuration of the first and second link members 34 and 36 in accordance with the exemplary embodiments of the present invention results in the running direction of the chain 16 being substantially aligned with the chain guide 32, as shown in FIG. 4, thereby improving a shifting performance and reducing contact noise between the chain 16 and the chain guide 32.

A power supply is connected to the motor unit 24 to supply power to the motor unit to rotate the motor output shaft 46. The motor unit 24 includes an electrical motor and a speed reduction gear assembly, as shown in FIG. 3. The electrical motor outputs drive power via the speed reduction gear assembly to the motor output shaft 46. The electrical motor and the speed reduction gear assembly are disposed in the housing of the motor unit 24. The electrical motor is preferably a reversible electrical motor. Rotation of the motor output shaft 46 in a first direction moves the movable member 20 and the chain guide 32 toward a low shift stage position with respect to the base member 18, and rotation of the motor output shaft 46 in a second and opposite direction moves the movable member 20 and the chain guide 32 toward a top shift stage position with respect to the base member 18. The rotation of the motor output shaft 46 results in rotation of the first and second link members 34 and 36 of the linkage 22. The rotation of the first and second link members 34 and 36 moves the base member 18 and the movable member 20, respectively. Various configurations of the linkage 22 are disclosed below, but such configurations are merely exemplary and the present invention is not limited to these configurations.

In a first exemplary embodiment shown in FIG. 3, the linkage 22 includes the first link member 34 and the second link member 36. The first and second link members 34 and 36 are gear members coaxially arranged with the pivot pin 38 and the motor output shaft 46, respectively. The first gear member is directly connected to the base member 18. The second gear member is directly connected to the movable member 20. The second gear member receives the motor output shaft 46, such that the motor unit 24 directly drives the second gear member of the second link member 36. The first gear member of the first link member 34 directly engages the second gear member of the second link member 36 such that rotation of the second gear members rotates the first gear member. Accordingly, rotation of the second gear member in a first direction results in rotation of the first gear member in a second and opposite direction. Thus, the first rotational direction of the first link member 34 and the second rotational direction of the second link member 36 are opposite. The first diameter of the first link member 34 is smaller than a second diameter of the second link member 36. The first tooth number of the first link member 34 is smaller than a second tooth number of the second link member 36.

In accordance with the first exemplary embodiment, the motor unit 24 drives the second link member 36, thus the rotational driving torque from the motor unit 24 is directly transmitted to the second link member 36 positioned close to the movable member 20. Therefore, a sufficiently large rotational driving torque is transmitted to the movable member 20 from the motor unit 24.

Figure 5:
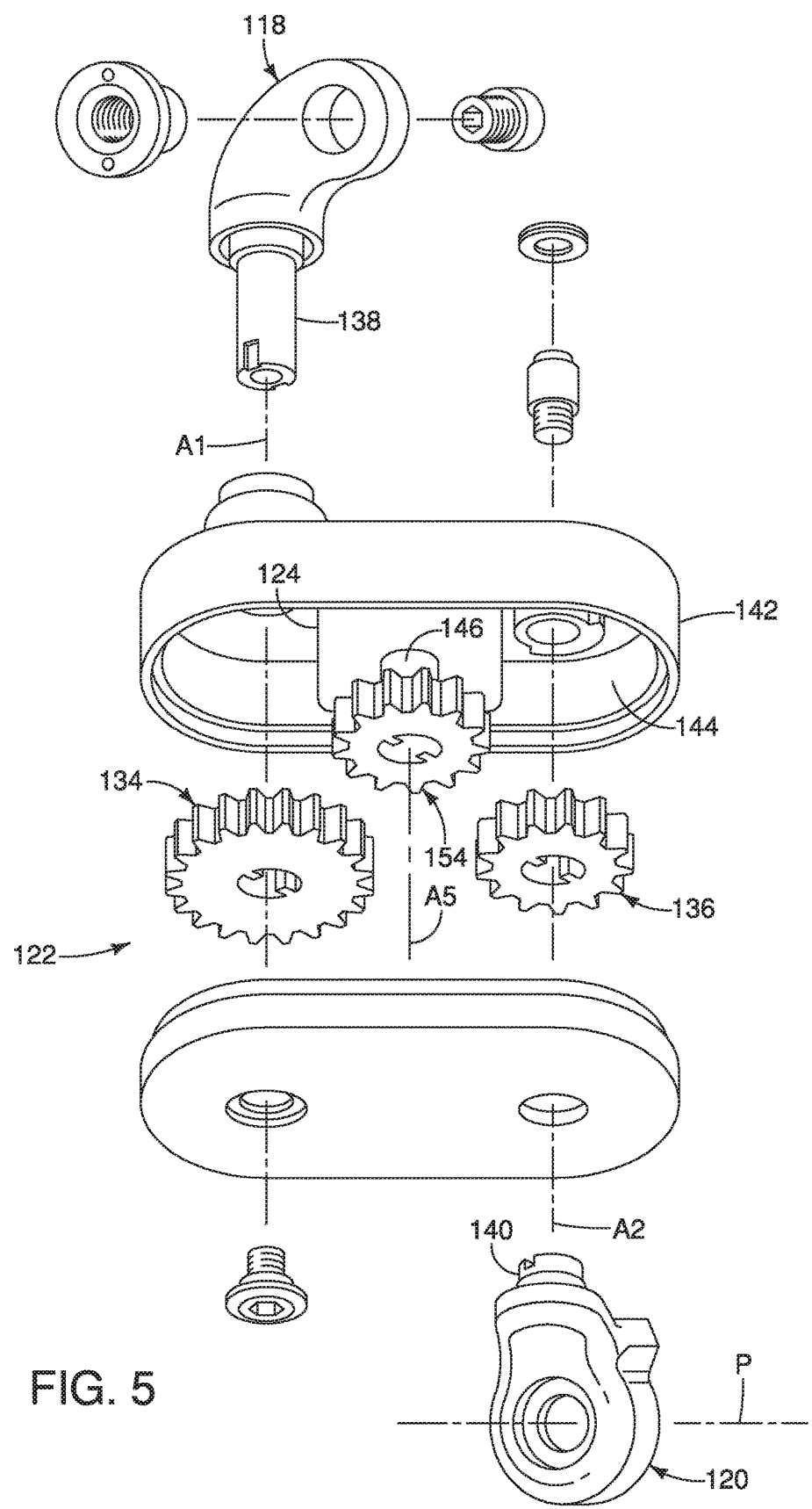
FIG. 5 is an exploded perspective view of an electrical bicycle derailleur in accordance with a second exemplary embodiment of the present invention including three link members.
Figure 6:
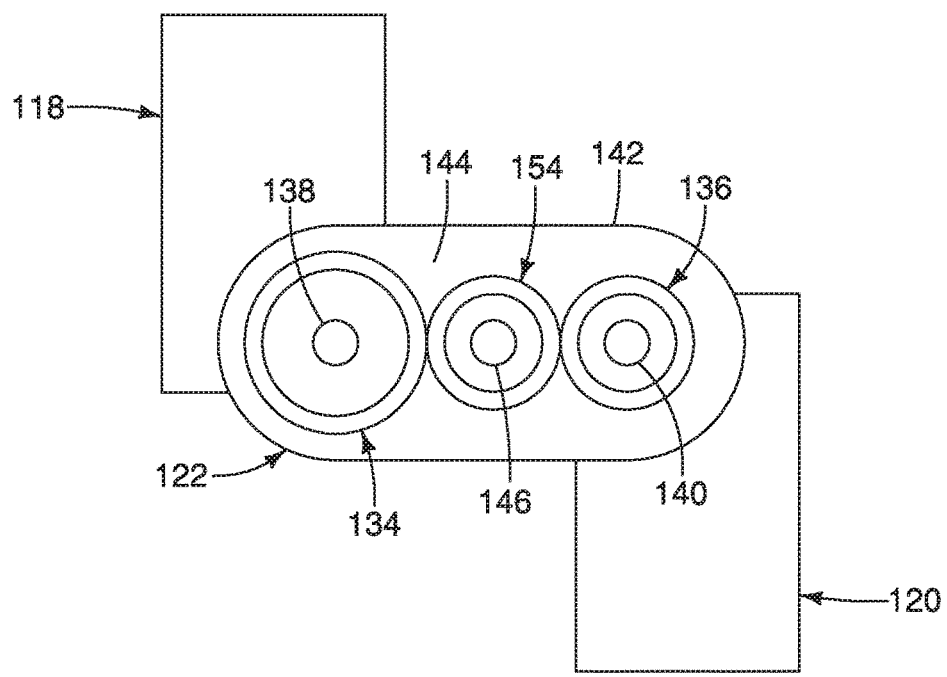
FIG. 6 is a schematic illustration of the electrical bicycle derailleur of FIG. 5.

As seen in FIGS. 5 and 6, an electrical bicycle derailleur in accordance with a second exemplary embodiment of the present invention is substantially similar to the electrical bicycle derailleur 12 of the first exemplary embodiment except for the differences described below. Similar parts are identified with similar reference numerals, except in the 100 series (i.e., 1xx).

A linkage 122 includes a third link member 154 in addition to the first and second link members 134 and 136. The third link member 154 is disposed between the first and second link members 134 and 136. The third link member 154 is supported by the linkage housing 142. The first link member 134, the second link member 136, the third link member 154, and the motor unit 124 are at least partly disposed in the internal space 144 of the linkage housing 142.

The third link member 154 includes a third gear member that receives the motor shaft 146 such that the motor unit 124 directly drives the third link member 154. The third link member 154 is rotatable about a third rotational axis A5. The first gear member is connected to the base member 118, and the second gear member of the second link member 136 is connected to the movable member 120. The third gear member of the third link member 154 is disposed between the first and second gear members. The first link member 134 includes a first axle 138 coaxially arranged with the first gear member. The second link member 136 includes a second axle 140 coaxially arranged with the second gear member. The third link member 154 includes a third axle 146 coaxially arranged with the third gear member. The third link member 154 operatively engages the gear members of the first and second link members 134 and 136 such that rotation of the third link member 154 in a first direction results in rotation of the first and second link members 134 and 136 in a second and opposite direction. Thus, the first rotational direction of the first link member 134 and the second rotational direction of the second link member 136 are the same. However, a rotational direction changing mechanism (not shown) is arranged between the second link member 136 and the movable member 120. Thus, the second rotational direction of the second link member 136 is opposite the first rotational direction of the first link member 134, thereby maintaining an orientation of the chain guide (32, FIG. 4). As shown in FIGS. 5 and 6, the third link member 154 directly engages the first and second link members 134 and 136. The motor unit 124 directly rotates the third link member 154, which is disposed closer to the movable member 120 than is the first link member 134. A first diameter of the first link member 134 is different from a second diameter of the second link member 136, and/or a first tooth number of the first link member 134 is different from a second tooth number of the second link member 136. As shown in FIGS. 5 and 6, the first diameter of the first link member 134 is larger than a second diameter of the second link member 136, and/or the first tooth number of the first link member 134 is greater than a second tooth number of the second link member 136.

Figure 7:
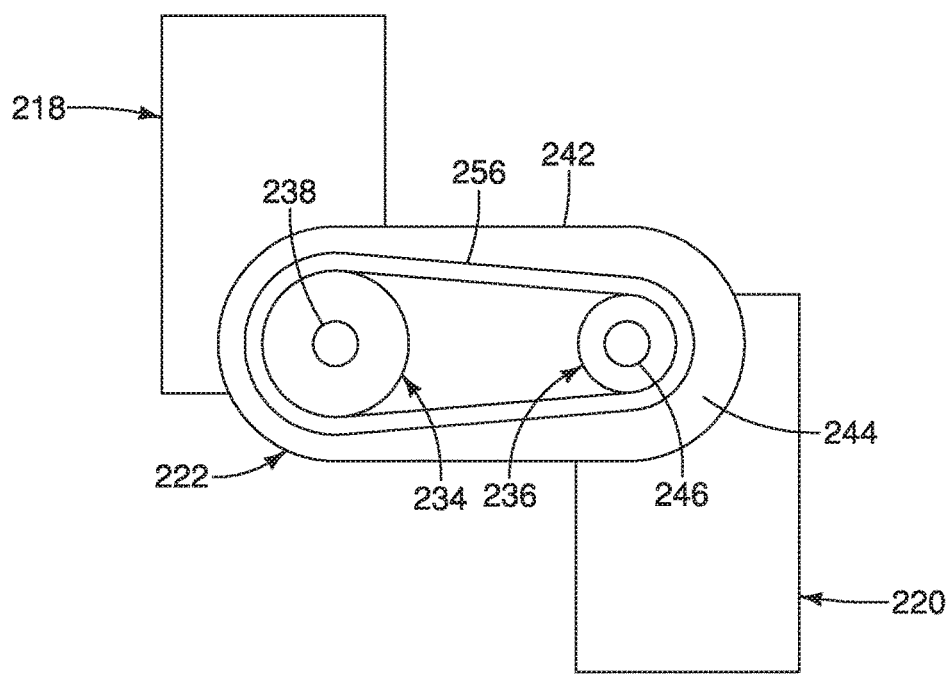
FIG. 7 is a schematic illustration of an electrical bicycle derailleur in accordance with a third exemplary embodiment of the present invention including two link members and a belt member.

As seen in FIG. 7, an electrical bicycle derailleur in accordance with a third exemplary embodiment of the present invention is substantially similar to the electrical bicycle derailleur 12 of the first exemplary embodiment except for the differences described below. Similar parts are identified with similar reference numerals, except in the 200 series (i.e., 2xx).

The linkage 222 includes a belt member 256 that operatively couples the first link member 234 and the second link member 236. The motor unit can be connected to either the first or second link member 234 and 236 such that rotation of the one of the first and second link members is transmitted to the other of the first and second link members via the belt member 256. The first link member 234, the second link member 236, the belt member 256, and the motor unit are at least partly disposed in the internal space 244 of the linkage housing 242.

As shown in FIG. 7, the motor shaft 246 of the motor unit directly drives the second link member 236, such that rotation of the second link member 236 is transmitted to the first link member 234 via the belt member 256. Accordingly, the first rotational direction of the first link member 234 is the same as the rotational direction of the second link member 236. The motor unit directly rotates the second link member 236, which is disposed closer to the movable member 220 than is the first link member 234. A first diameter of the first link member 234 is different from a second diameter of the second link member 236, and/or a first tooth number of the first link member 234 is different from a second tooth number of the second link member 236. As shown in FIG. 7, the first diameter of the first link member 234 is larger than a second diameter of the second link member 236, and/or the first tooth number of the first link member 234 is greater than a second tooth number of the second link member 236.

Figure 8:
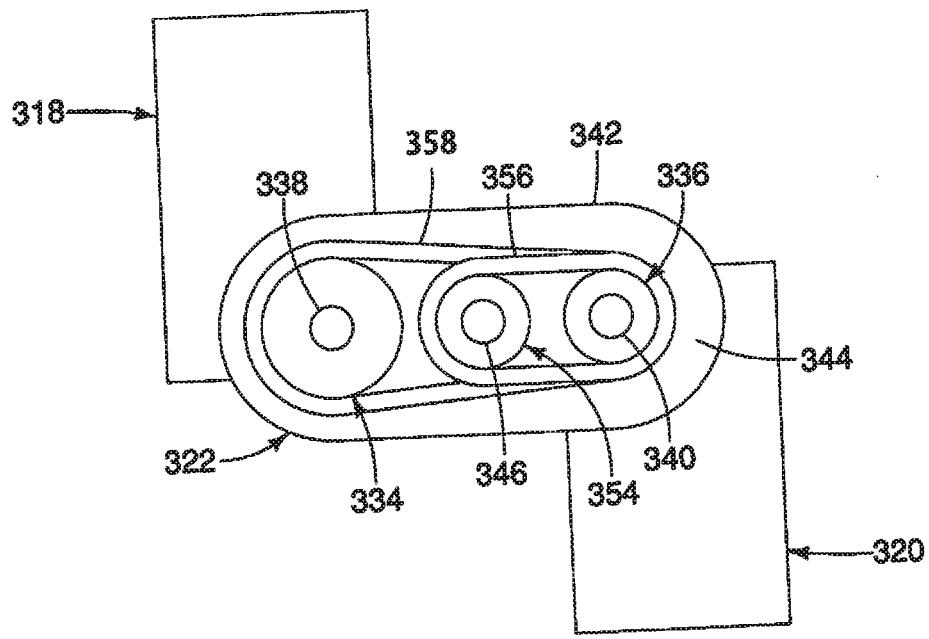
FIG. 8 is a schematic illustration of an electrical bicycle derailleur in accordance with a fourth exemplary embodiment of the present invention including three link members operatively coupled by two belt members.

As seen in FIG. 8, an electrical bicycle derailleur in accordance with a fourth exemplary embodiment of the present invention is substantially similar to the electrical bicycle derailleur 12 of the first exemplary embodiment except for the differences described below. Similar parts are identified with similar reference numerals, except in the 300 series (i.e., 3xx).

The linkage 322 includes a third link member 354, a first belt member 356 and a second belt member 358 in addition to the first and second link members 334 and 336. The third link member 354 is disposed between the first and second link members 334 and 336 and spaced therefrom. The third link member 354 is supported by the linkage housing 342. The first link member 334, the second link member 336, the third link member 354, the first belt member 356, the second belt member 358 and the motor unit are at least partly disposed in the internal space 344 of the linkage housing 342.

The third link member 354 receives the motor shaft 346 such that the motor unit directly drives the third link member 354. The first link member 334 is connected to the base member 318, and the second link member 336 is connected to the movable member 320. At least one belt member operatively couples the third link member and at least one of the first and second link members such that rotation of the third link member rotates the at least one of the first and second link members via the at least one belt member. The first belt member 356 operatively couples the second and third link members 336 and 354. The second belt member 358 operatively couples the first and second link members 334 and 336.

The motor unit directly drives the third link member 354 such that the first and second belt members 356 and 358 travel in the same direction. Accordingly, the first, second and third rotational directions of the first, second and third link members 334, 336 and 354, respectively, are the same. However, the rotational direction changing mechanism (not shown) is arranged between the second link member 336 and the movable member 320. Thus, the second rotational direction of the second link member 336 is opposite the first rotational direction of the first link member 334, thereby maintaining an orientation of the chain guide (32, FIG. 4). The motor unit directly rotates the third link member 354, which is disposed closer to the movable member 320 than is the first link member 334. A first diameter of the first link member 334 is different from a second diameter of the second link member 336, and/or a first tooth number of the first link member 334 is different from a second tooth number of the second link member 336. As shown in FIG. 8, the first diameter of the first link member 334 is larger than a second diameter of the second link member 336, and/or the first tooth number of the first link member 334 is greater than a second tooth number of the second link member 336.

Figure 9:
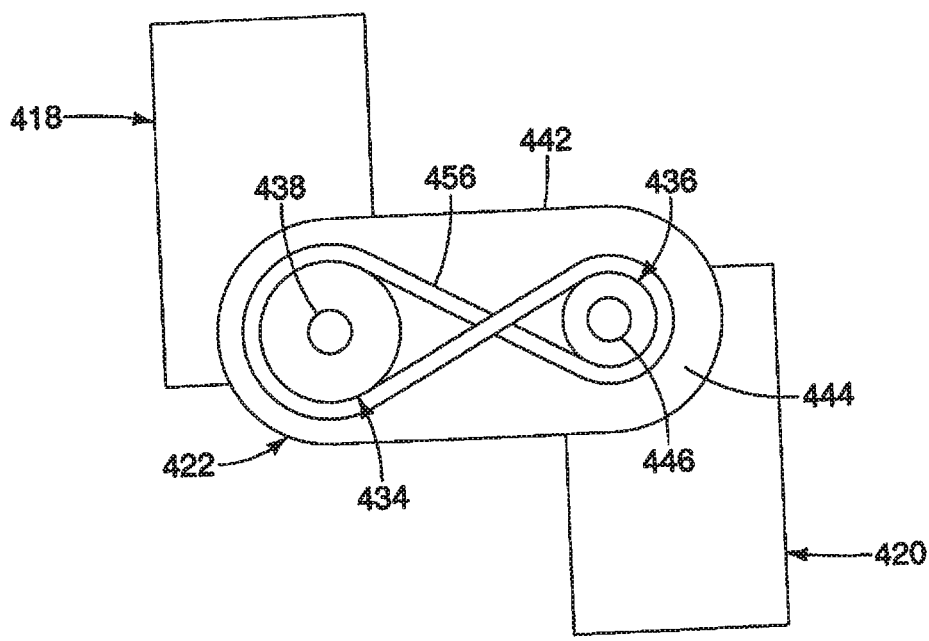
FIG. 9 is a schematic illustration of an electrical bicycle derailleur in accordance with a fifth exemplary embodiment of the present invention including two link members operatively coupled by a cross-over belt member.

As seen in FIG. 9, an electrical bicycle derailleur in accordance with a fifth exemplary embodiment of the present invention is substantially similar to the electrical bicycle derailleur 12 of the first exemplary embodiment except for the differences described below. Similar parts are identified with similar reference numerals, except in the 400 series (i.e., 4xx).

The linkage 422 includes a belt member 456 that operatively couples the first link member 434 and the second link member 436. The belt member 456 is a cross-over belt. The motor unit can be connected to either the first or second link member 434 and 436 such that rotation of the one of the first and second link members is transmitted to the other of the first and second link members via the belt member 456. The first link member 434, the second link member 436, the belt member 456, and the motor unit are at least partly disposed in the internal space 444 of the linkage housing 442.

As shown in FIG. 9, the motor shaft 446 of the motor unit directly drives the second link member 436, such that rotation of the second link member 436 is transmitted to the first link member 434 via the belt member 456. Accordingly, the belt member 456 being a cross-over belt provides that the first rotational direction of the first link member 434 is opposite the rotational direction of the second link member 436, thereby maintaining an orientation of the chain guide (32, FIG. 4). The motor unit directly rotates the second link member 436, which is disposed closer to the movable member 420 than is the first link member 434. A first diameter of the first link member 434 is different from a second diameter of the second link member 436, and/or a first tooth number of the first link member 434 is different from a second tooth number of the second link member 436. As shown in FIG. 9, the first diameter of the first link member 434 is larger than a second diameter of the second link member 436, and/or the first tooth number of the first link member 434 is greater than a second tooth number of the second link member 436.

Figure 10:
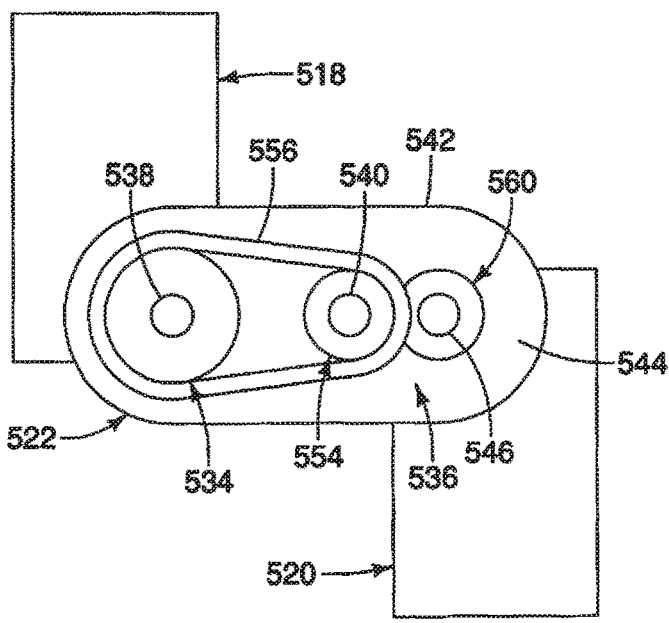
FIG. 10 is a schematic illustration of an electrical bicycle derailleur in accordance with a sixth exemplary embodiment of the present invention including three link members in which two link members are operatively coupled by a belt member.
Figure 11:
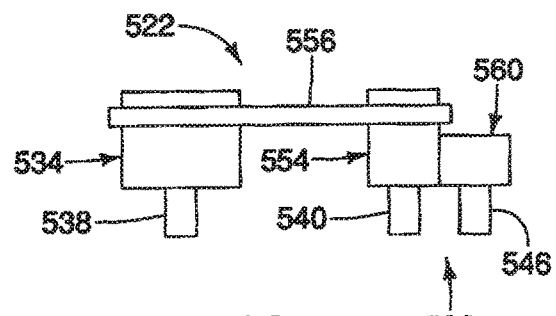
FIG. 11 is a top plan view of the schematic illustration of a linkage of FIG. 10.

As seen in FIGS. 10 and 11, an electrical bicycle derailleur in accordance with a sixth exemplary embodiment of the present invention is substantially similar to the electrical bicycle derailleur 12 of the first exemplary embodiment except for the differences described below. Similar parts are identified with similar reference numerals, except in the 500 series 5xx).

The linkage 522 includes a first link member 534, a second link member 536, and a belt member 556. The second link member 536 includes a primary second gear member 560 and a secondary second gear member 554. A second axle 546 is coaxially arranged with the primary second gear member 560. A third axle 540 is coaxially arranged with the secondary second gear member 554. The second link member 536 is spaced from the first link member 534.

The first link member 534, the second link member 536, the belt member 556 and the motor unit are at least partly disposed in the internal space 544 of the linkage housing 542.

The primary second gear member 560 receives the motor shaft 546 of the motor unit such that the motor unit directly drives the primary second gear member 560. The secondary second gear member 554 directly engages the primary second gear member 560, such that rotation of the primary gear member 560 rotates the secondary second gear member 554. A second rotational direction of the primary second gear member 560 is opposite a third rotational direction of the secondary second gear member 554.

Rotation of the secondary second gear member 554 is transmitted to the first link member 534 via the belt member 556. Accordingly, a first rotational direction of the first link member 534 is the same as the third rotational direction of the secondary second gear member 554. The first rotational direction of the first link member 534 is opposite the second rotational direction of the primary second gear member 560, thereby maintaining an orientation of the chain guide (32, FIG. 4). The motor unit directly rotates the primary second gear member 560, which is disposed closer to the movable member 520 than is the first link member 534. A first diameter of the first link member 534 is different from a second diameter of the second link member 536, and/or a first tooth number of the first link member 534 is different from a second tooth number of the second link member 536. As shown in FIGS. 10 and 11, the first diameter of the first link member 534 is larger than a, second diameter of the second link member 536, and/or the first tooth number of the first link member 534 is greater than a second tooth number of the second link member 536.

Figure 12:
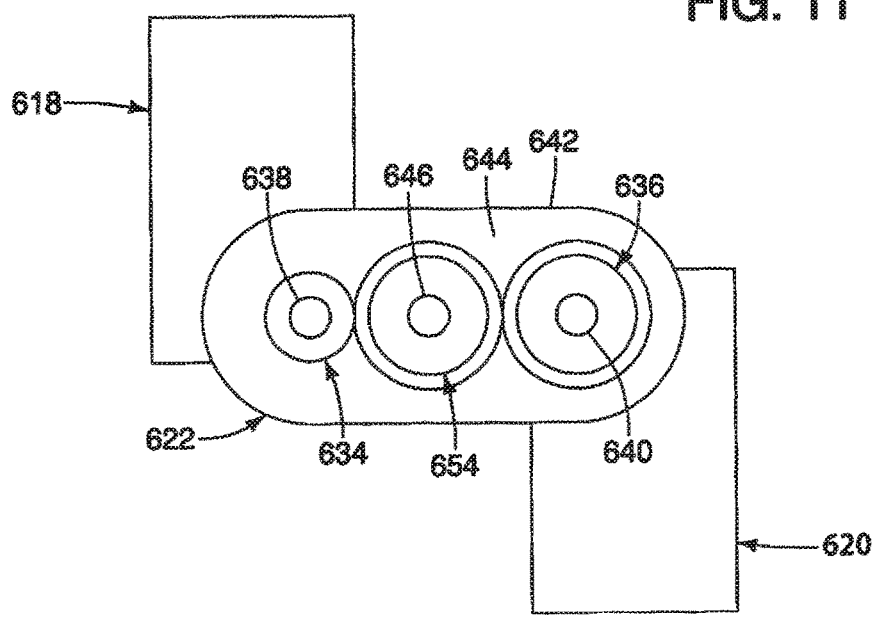
FIG. 12 is a schematic illustration of an electrical bicycle derailleur in accordance with a seventh exemplary embodiment of the present invention including three link members.

As seen in FIG. 12, an electrical bicycle derailleur in accordance with a seventh exemplary embodiment of the present invention is substantially similar to the electrical bicycle derailleur 12 of the first exemplary embodiment except for the differences described below. Similar parts are identified with similar reference numerals, except in the 600 series (i.e., 6xx).

A linkage 622 includes a third link member 654 in addition to the first and second link members 634 and 636. The third link member 654 is disposed between the first and second link members 634 and 636. The third link member 654 is supported by the linkage housing 642. The first link member 634, the second link member 636, the third link member 654, and the motor unit are at least partly disposed in the internal space 644 of the linkage housing 642.

The third link member 654 includes a third gear member that receives the motor shaft 646 such that the motor unit directly drives the third link member 654. The first gear member of the first link member 634 is connected to the base member 618, and the second gear member of the second link member 636 is connected to the movable member 620. The third gear member of the third link member 654 is disposed between the first and second gear members. The third link member 654 operatively engages the gear members of the first and second link members 634 and 636 such that rotation of the third link member 654 in a first direction results in rotation of the first and second link members 634 and 636 in a second and opposite direction. Thus, the first rotational direction of the first link member 634 and the second rotational direction of the second link member 636 are the same. However, a rotational direction changing mechanism (not shown) is arranged between the second link member 636 and the movable member 620. Thus, the second rotational direction of the second link member 636 is opposite the first rotational direction of the first lurk member 634, thereby maintaining an orientation of the chain guide (32, FIG. 4). As shown in FIG. 12, the third link member 654 directly engages the first and second link members 634 and 636. The motor unit directly rotates the third link member 654, which is disposed closer to the movable member 620 than is the first link member 634.

A first diameter of the first link member 634 is different from a second diameter of the second link member 636, and/or a first tooth number of the first link member 634 is different from a second tooth number of the second link member 636. As shown in FIG. 12, the first diameter of the first link member 634 is smaller than a second diameter of the second link member 636, and/or the first tooth number of the first link member 634 is smaller than a second tooth number of the second link member 636.

Figure 13:
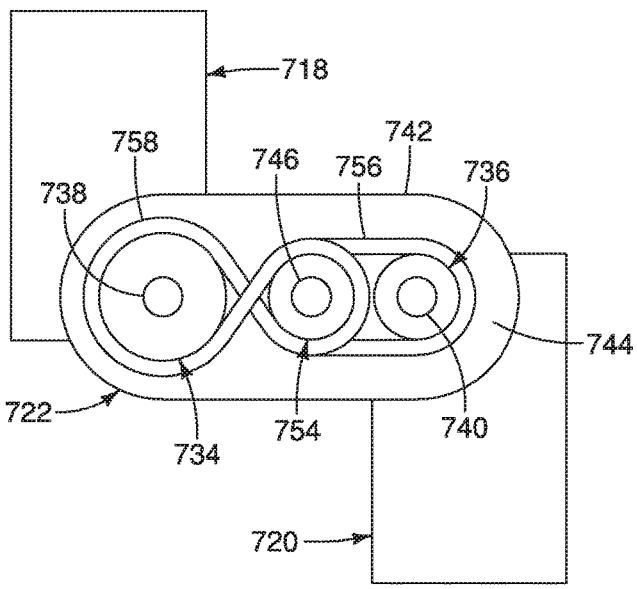
FIG. 13 is a schematic illustration of an electrical bicycle derailleur in accordance with an eighth exemplary embodiment of the present invention including three link members operatively coupled by two belt members.
Figure 14:
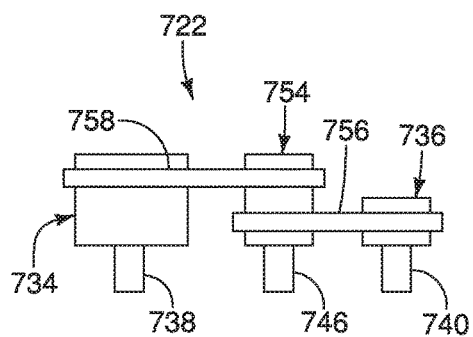
FIG. 14 is a top plan view of the schematic illustration of the linkage of FIG. 13.

As seen in FIGS. 13 and 14, an electrical bicycle derailleur in accordance with an eighth exemplary embodiment of the present invention is substantially similar to the electrical bicycle derailleur 12 of the first exemplary embodiment except for the differences described below. Similar parts are identified with similar reference numerals, except in the 700 series (i.e., 7xx).

The linkage 722 includes a third link member 754, a first belt member 756 and a second belt member 758 in addition to the first and second link members 734 and 736. The third link member 754 is disposed between the first and second link members 734 and 736 and spaced therefrom. The third link member 754 is supported by the linkage housing 742. The first link member 734, the second link member 736, the third link member 754, the first belt member 756, the second belt member 758 and the motor unit are at least partly disposed in the internal space 744 of the linkage housing 742.

The third link member 754 receives the motor shaft 746 such that the motor unit directly drives the third link member 754. The first link member 734 is connected to the base member 718, and the second link member 736 is connected to the movable member 720. The first belt member 756 operatively couples the second and third link members 736 and 754. The second belt member 758 operatively couples the first and third link members 734 and 754. The second belt member 758 is a cross-over belt.

The motor unit directly drives the third link member 754 such that the first and second belt members 756 and 758 travel in the same direction. Accordingly, the second and third rotational directions of the second and third link members 736 and 754, respectively, are the same. The second belt member 758 is a cross-over belt such that the first rotational direction of the first link member 734 is opposite the third rotational direction of the third link member 754. Accordingly, the first rotational direction of the first link member 734 is opposite the second rotational direction of the second link member 736, thereby maintaining the orientation of the chain guide (32, FIG. 4). The motor unit directly rotates the third link member 754, which is disposed closer to the movable member 720 than is the first link member 734.

A first diameter of the first link member 734 is different from a second diameter of the second link member 736, and/or a first tooth number of the first link member 734 is different from a second tooth number of the second link member 736. As shown in FIGS. 13 and 14, the first diameter of the first link member 734 is larger than a second diameter of the second link member 736, and/or the first tooth number of the first link member 734 is greater than a second tooth number of the second link member 736.

Figure 15:
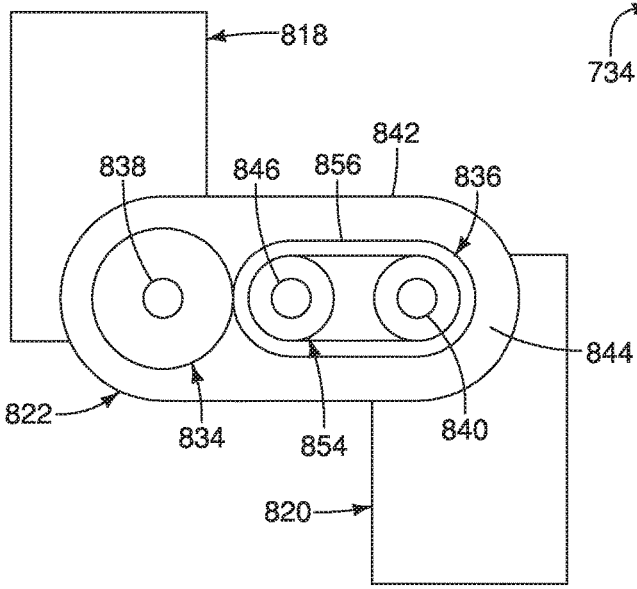
FIG. 15 is a schematic illustration of an electrical bicycle derailleur in accordance with a ninth exemplary embodiment of the present invention including three link members in which two link members are operatively coupled by a belt member.
Figure 16:
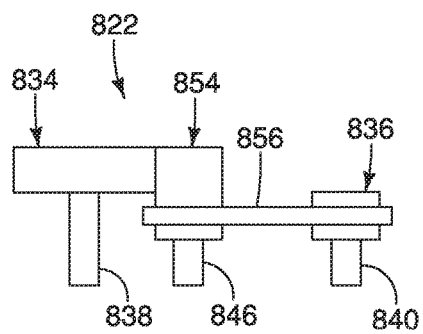
FIG. 16 is a top plan view of the schematic illustration of the linkage of FIG. 15.

As seen in FIGS. 15 and 16, an electrical bicycle derailleur in accordance with a ninth exemplary embodiment of the present invention is substantially similar to the electrical bicycle derailleur 12 of the first exemplary embodiment except for the differences described below. Similar parts are identified with similar reference numerals, except in the 800 series (i.e., 8xx).

The linkage 822 includes a first link member 834, a second link member 836, a third link member 854 and a belt member 856. The third link member 854 is disposed between the first and second link members 834 and 836. The third link member 854 directly engages the first link member 834 and is spaced from the second link member 836. The third link member 854 is supported by the linkage housing 842. The first link member 834, the second link member 836, the third link member 854, the belt member 856 and the motor unit are at least partly disposed in the internal space 844 of the linkage housing 842.

The third link member 854 receives the motor shaft 846 of the motor unit such that the motor unit directly drives the third link member 854. The third link member 854 directly engages the first link member 834, as shown in FIG. 16, such that rotation of the third link member 854 rotates the first link member 834. A first rotational direction of the first link member 834 is opposite a third rotational direction of the third link member 854.

Rotation of the third link member 854 is transmitted to the second link member 836 via the belt member 856. Accordingly, the third rotational direction of the third link member 854 is the same as the second rotational direction of the second link member 836. Thus, the second rotational direction of the second link member 836 is opposite the first rotational direction of the first link member 834, thereby maintaining an orientation of the chain guide (32, FIG. 4). The motor unit directly rotates the third link member 854, which is disposed closer to the movable member 820 than is the first link member 834.

A first diameter of the first link member 834 is different from a second diameter of the second link member 836, and/or a first tooth number of the first link member 834 is different from a second tooth number of the second link member 836. As shown in FIGS. 15 and 16, the first diameter of the first link member 834 is larger than a second diameter of the second link member 836, and/or the first tooth number of the first link member 834 is greater than a second tooth number of the second link member 836.

Figure 17:
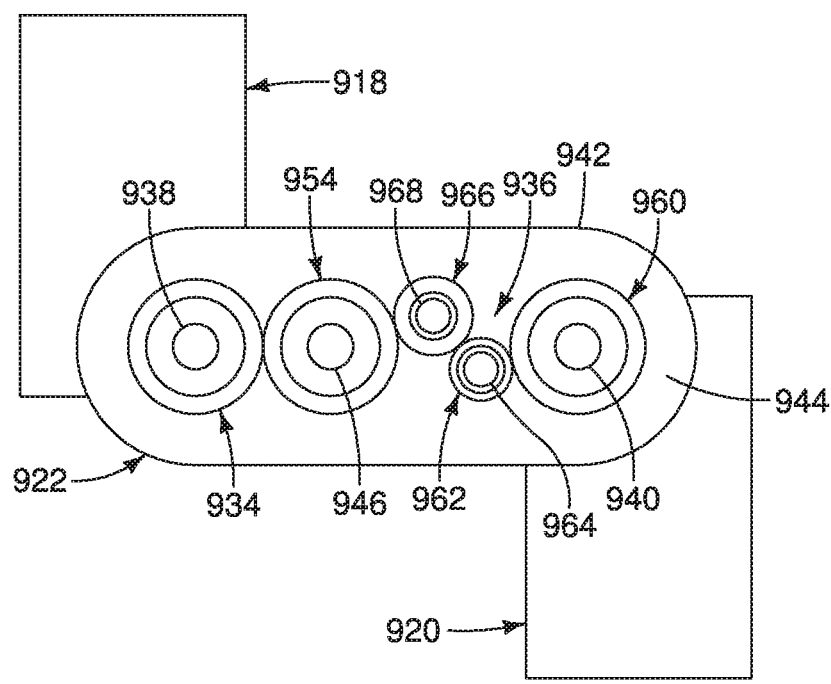
FIG. 17 is a schematic illustration of an electrical bicycle derailleur in accordance with a tenth exemplary embodiment of the present invention including three link members in which a second link member includes a plurality of gear members.

As seen in FIG. 17, an electrical bicycle derailleur in accordance with a tenth exemplary embodiment of the present invention is substantially similar to the electrical bicycle derailleur 12 of the first exemplary embodiment except for the differences described below. Similar parts are identified with similar reference numerals, except in the 900 series (i.e., 9xx).

The linkage 922 includes a first link member 934, a second link member 936, and a third link member 954. The second link member 936 includes a primary second gear member 960, a secondary second gear member 962 and a tertiary second gear member 966. A first axle 940 is coaxially arranged with the primary second gear member 960. A second axle 964 is coaxially arranged with the secondary second gear member 962. A third axle 968 is coaxially arranged with the tertiary second gear member 966.

The third link member 954 is disposed between the first and second link members 934 and 936. The third link member 954 is supported by the linkage housing 942. The first link member 934, the second link member 936, the third link member 954 and the motor unit are at least partly disposed in the internal space 944 of the linkage housing 942.

The third link member 954 receives the motor shaft 946 of the motor unit such that the motor unit directly drives the third link member 954. The third link member 954 directly engages the first link member 934, such that rotation of the third link member 954 rotates the first link member 934. A third rotational direction of the third link member 954 is opposite a first rotational direction of the first link member 934.

Rotation of the third link member 954 is transmitted to the second link member 936 through the tertiary, secondary and primary second gear members 966, 962 and 960, respectively. Rotation of the third link member 954 in a first rotational direction results in rotation of the tertiary second gear member 965 in a fourth and opposite rotational direction. Rotation of the tertiary second gear member 966 in the fourth rotational direction results in rotation of the secondary second gear member 962 in a fifth and opposite rotational direction. Rotation of the secondary second gear member 962 in the fifth rotational direction results in rotation of the primary second gear member 960 in a second and same rotational direction. Accordingly, the first rotational direction of the first link member 934 and the second rotational direction of the primary second gear member 960 are the same. However, a rotational direction changing mechanism (not shown) is arranged between the second link member 960 and the movable member 920. Thus, the second rotational direction of the primary second gear member 960 is opposite the first rotational direction of the first link member 934, thereby maintaining an orientation of the chain guide (32, FIG. 4). The primary second gear member 960 is connected to the movable member 920. The motor unit directly rotates the third link member 954, which is disposed closer to the movable member 920 than is the first link member 934.

A first diameter of the first link member 934 is different from a second diameter of the second link member 936, and/or a first tooth number of the first link member 934 is different from a second tooth number of the second link member 936. As shown in FIG. 17, the second link member 936 includes the primary, secondary and tertiary second gear members 960, 962 and 966, respectively, such that the diameter and the tooth number of the second link member 936 are larger than the diameter and tooth number of the first link member 934. Accordingly, the rotational characteristics of the first and second link members 934 and 936 are different.

As used herein, directional terms, such as "inward" and "outward", as well as any other similar directional terms, refer to those directions of a device equipped with the present invention. Accordingly, these terms, as utilized to describe the present invention should be interpreted relative to a device equipped with the present invention.

The terms of degree, such as "substantially", as used herein mean a reasonable amount of deviation of the modified term such that the end result is not significantly changed.

While only selected exemplary embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the exemplary embodiments according to the present invention are provided for illustration only, and not for the purpose of limiting the invention as defined by the appended claims and their equivalents. Thus, the scope of the invention is not limited to the disclosed exemplary embodiments.

What is claimed is:

1. An electrical bicycle derailleur comprising:
   a base member;
   a movable member movably arranged between a retracted position and an extended position;
   a linkage operatively coupling the movable member to the base member, the linkage including a first link member and a second link member, the first link member being disposed closer to the base member than the second link member;
   a motor unit operatively coupled to the first and second link members to rotate the first and second link members; and
   a linkage housing configured to support the first and second link members and the motor unit,
   at least one of a first diameter of the first link member being different from a second diameter of the second link member and a first tooth number of the first link member being different from a second tooth number of the second link member.

2. The electrical bicycle derailleur according to claim 1, wherein
   the first link member includes a first gear member connected to the base member, and the second link member includes a second gear member connected to the movable member.

3. The electrical bicycle derailleur according to claim 1, wherein
   the first diameter of the first link member is larger than the second diameter of the second link member.

4. The electrical bicycle derailleur according to claim 1, wherein
   the first diameter of the first link member is smaller than the second diameter of the second link member.

5. The electrical bicycle derailleur according to claim 1, wherein
   the first tooth number of the first link member is larger than the second tooth number of the second link member.

6. The electrical bicycle derailleur according to claim 1, wherein
   the first tooth number of the first link member is smaller than the second tooth number of the second link member.

7. The electrical bicycle derailleur according to claim 1, wherein the linkage housing includes an internal space in which the first and second link members and the motor unit are at least partly disposed.

8. The electrical bicycle derailleur according to claim 1, wherein
the first link member directly engages the second link member.

9. The electrical bicycle derailleur according to claim 1, wherein
at least one belt member operatively couples the first link member and the second link member such that rotation of the one of the first and second link members is transmitted to the other of the first and second link members via the at least one belt member, the motor unit being configured to rotate the second link member.

10. The electrical bicycle derailleur according to claim 1, wherein
the linkage further includes a third link member disposed between the first and second link members, the third link member operatively engages the first and second link members, and the linkage housing is configured to support the third link member.

11. The electrical bicycle derailleur according to claim 10, wherein
the linkage housing includes an internal space in which the first, second, and third link members and the motor unit are at least partly disposed.

12. The electrical bicycle derailleur according to claim 10, wherein
the first link member includes a first gear member connected to the base member, the second link member includes a second gear member connected to the movable member, and the third link member includes a third gear member disposed between the first and second gear members.

13. The electrical bicycle derailleur according to claim 10, wherein
the third link member directly engages the first and second link members.

14. The electrical bicycle derailleur according to claim 10, wherein
at least one belt member operatively couples the third link member and at least one of the first and second link members such that rotation of the third link member rotates the at least one of the first and second link members via the at least one belt member.

15. The electrical bicycle derailleur according to claim 1, wherein
a first rotational direction of the first link member and a second rotational direction of the second link member are opposite.

16. The electrical bicycle derailleur according to claim 1, wherein
the motor unit includes an electrical motor and a speed reduction gear assembly, the electrical motor outputs drive power via the speed reduction gear assembly.

17. The electrical bicycle derailleur according to claim 2, wherein
the first link member includes a first axle coaxially arranged with the first gear member, and the second link member includes a second axle coaxially arranged with the second gear member.

18. The electrical bicycle derailleur according to claim 12, wherein
the first link member includes a first axle coaxially arranged with the first gear member, the second link member includes a second axle coaxially arranged with the second gear member, and the third link member includes a third axle coaxially arranged with the third gear member.

* * * * *